United States Patent [19]
Muller et al.

[11] 3,842,881
[45] Oct. 22, 1974

[54] TIRE CHAIN

[75] Inventors: Anton Muller, Unterkochen; Hubert Konig, Aalen; Ludwig Strobel, Unterkochen, all of Germany

[73] Assignee: Eisen- und Drahtwerk Erlau Aktiengesellschaft, Aalen, Germany

[22] Filed: July 6, 1972

[21] Appl. No.: 269,308

[30] Foreign Application Priority Data
July 7, 1971   Germany............................ 2133801

[52] U.S. Cl.............. 152/213 A, 152/217, 152/239
[51] Int. Cl........................................... B60c 27/12
[58] Field of Search ....... 152/213 A, 217, 219, 239, 152/213 R

[56] References Cited
UNITED STATES PATENTS

| | | | |
|---|---|---|---|
| 1,493,878 | 5/1924 | Hanson............................. | 152/217 |
| 1,989,217 | 1/1935 | Sisk.................................. | 152/213 A |
| 2,431,709 | 12/1947 | Royer................................ | 152/219 |
| 2,743,754 | 5/1956 | Maresh............................. | 152/213 R |
| 2,767,760 | 10/1956 | Granger............................ | 152/213 R |
| 3,025,901 | 3/1962 | Bengert............................ | 152/239 |

*Primary Examiner*—Robert G. Sheridan
*Assistant Examiner*—Kenneth Noland
*Attorney, Agent, or Firm*—Walter Becker

[57] ABSTRACT

An antiskid chain for a vehicle tire in which the chain comprises a running portion for engaging the tread of the tire and inner and outer ring portions which, when the tire is in mounted position, are at the axially inner and axially outer sides respectively of the tire. All of the portions are divided at one circumferential point of the tire with connectors detachably connecting the opposite ends of the inner and outer ring portions. The inner ring portion is divided at a second point spaced at about 180 degrees from the first mentioned point extending in one circumferential direction between the points is a relatively stiff arcuate member while extending in the other circumferential direction between the points is another flexible member such as a chain. The outer ring portion is connected to the running portion at spaced points and is substantially longer in the circumferential direction in the circumference of the circle on which the spaced points lie in mounted condition of the chain. A longitudinally resilient member engaging the outer ring portion between the spaced points pulls it radially inwardly into a zig-zag shape and holds it taut. Also, disclosed is a method of mounting the chain on a tire.

14 Claims, 5 Drawing Figures

TIRE CHAIN

The present invention relates to a tire chain with a running section which is provided between two marginal portions, namely an outer and an inner portion, which in condition of operation form a ring. The inner portion has an assembly member which extends around the tire axis and has its ends connected to the remaining section of the inner portion while at least one end of the assembly member is by means of a closure element detachably connected to the remaining section of the inner portion.

A tire chain of this type has become known according to which the inner portion is formed by two semicircular yoke halves which are articulated to each other and have hook-shaped ends which face away from the point where they are linked together, and are detachably connected to each other. The chain sections of the running portion are linked to the two yoke halves in the manner of a ladder chain, which means is built up merely of transverse chains arranged one behind the other in the circumferential direction of the tire. The outer portion is formed by a polygonal ring in which individual sections of the running portion may be detachably suspended. The closing of the inner portion is rather awkward since the tire has to be held by both hands and moreover the two hooks of the inner portion are not visible during the closing operation. Furthermore, such a design is suitable primarily only for a very simple construction, as for instance, a ladder chain-like construction of the running portion which, according to present day findings, is not suitable for an effective skid protection and for a satisfactory tracking.

It is, therefore, an object of the present invention so to design a tire chain, especially a skid protective chain for tires, as for instance a snow chain, of the above mentioned type that in spite of a simple construction an easy assembly will be assured and that also running sections may be provided according to which the running sections have inclined chain portions or chain portions parallel to the running direction, while the chain portions of the running section may be arranged in relatively close sequence.

These and other objects and advantages of the invention will appear more clearly from the following specification in connection with the accompanying drawings, in which.

Figure 3:
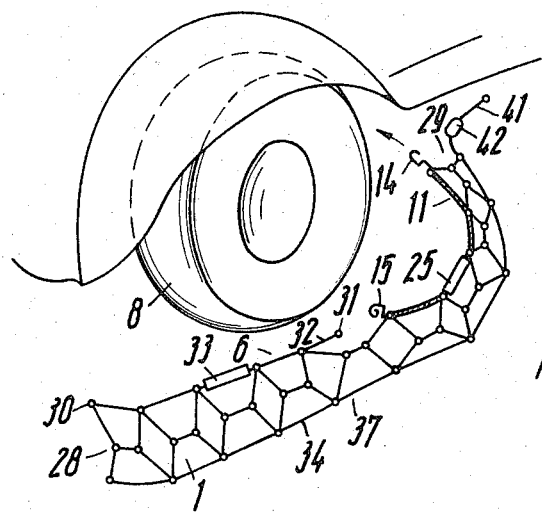
Figure 4:
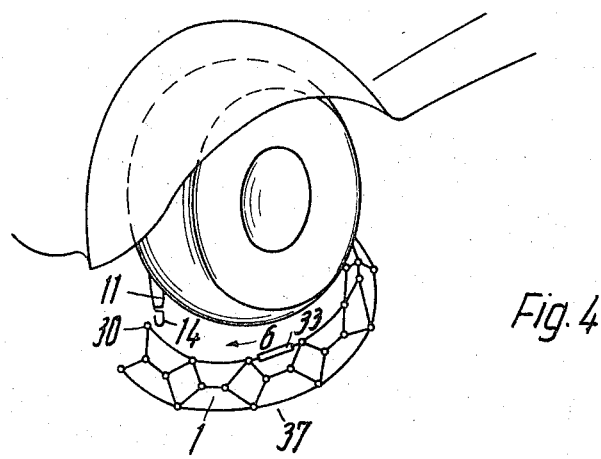
Figure 5:
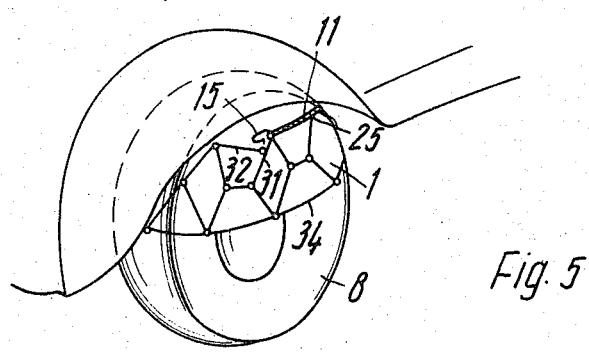

FIGS. 3 to 5 respectively illustrate in perspective view different phases of the assembly of the tire chain according to the invention upon a tire.

The tire protective chain according to the present invention, according to which between two marginal portions, which in operative condition of the chain are circular, there is arranged an outer and an inner portion, is characterized primarily in that the two ends of the assembly member pertaining to the inner portion comprise closing members for a detachable connection with the remaining section of the inner member, and is furthermore characterized in that the outer portion is adapted to be widened relative to the tire as it appears in assembled condition. In this way the assembly member, without extending behind the wheel, can be placed upon the road behind the wheel whereupon the remaining section of the inner portion can be slipped from the front over the tire in such a way that the assembly member rises in a plane transverse to the tire axis. Subsequently the closure elements of the assembly member may be moved to the front side of the tire and there be connected with the remaining section of the inner portion so that the latter will be closed. This is possible due to the fact that in view of the widened-up outer portion the running section is still in non-tnesioned condition. If now the outer portion is transformed from its widened condition into the condition of operation, for instance by tensioning, simultaneously the running section will be tensioned whereby the inner portion as well as the entire tire chain will align themselves to the tire. Even with a relatively small pitch of the tire chain, in other words with a relatively close structure of the running section of the tire chain, due to this design a moving of the tire, i.e. a jacking up of the tire or a rolling of the tire is not necessary so that the tire chain according to the invention can also be mounted upon a tire which got stuck in the track. It has proved expedient to provide the assembly member, which preferably is partially circular and may have a polygonal contour, with a circular angle of approximately 180°.

It is particularly expedient if the circular arc of the assembly member corresponds to an even number multiple of the pitch of the running section while preferably the circular angle of the assembly member is smaller than that of the running section of the inner portion, especially about the pitch angle, so that the assembly member will in spite of being easily handled have relatively small dimensions.

It is also possible that the running section of the inner portion is formed by a yoke. However, it is particularly advantageous when the remaining section of the inner portion is formed by a flexible pull strand, especially a chain strand, which can be slipped over the tire in a particularly simple manner.

A further simplification in the assembly of the tire chain is obtained when a closure element of the assembly member, which element serves as opening element for the running section, is provided on the inner portion between two adjacent joints or linkage points of end chain sections of the running section. These end chain members extend from the inner portion without connection therebetween to the outer portion, preferably to the separate linkage points on the outer portion. In this way the running section can at the corresponding locations, starting from the inner portion, be opened at least to the outer portion so that it can easily be slipped over the tire when cuffing over the remaining section of the inner portion. Expediently, the other closure element of the assembly member is provided on the inner portion between two adjacent joints of the chain parts of the running section. These chain parts are in spaced relationship to each other interconnected by a tracking chain part so that at this point the running portion will remain closed also when the inner portion is opened and will therefore during the assembly of the chain on the tire permit the operator to view all parts being assembled.

The closing elements of the assembly member may in a simple manner be formed by hooks for engaging the chain links of the remaining section of the inner portion. For purposes of additionally simplifying the assembly, the suspension openings of the closing elements of the assembly member engage the convexly curved side of the assembly member.

In order to assure that the assembly member will be able during the assembly and in operation to adapt itself to the respective tire, the assembly member itself is elastically resilient. According to a simple design, the assembly member includes a bar with which the closing elements preferably form a single piece. In order to permit an easy grasping of the assembly member, the latter has at least one handle which is preferably provided between two linkage points of the running section. In order to save the tire and to increase the grip of the assembly member, the assembly member, especially the bar thereof, is approximately over its entire length surrounded by mantle sections respectively located between two adjacent joints of the running section. These mantle sections are preferably formed by mounted sleeves of rubber elastic material, at least one of which may form the handle.

In order to be sure that the assembly member is properly connected to the running section and will, when cuffing over the remaining sections of the inner portion, rise by itself in a simple manner, the ends of the assembly member are preferably directly adjacent to the closing members linked to the running section.

The cuffing over of the remaining section of the inner portion may be simplified by providing a handle which is located preferably symmetrically opposite on the remaining section of the inner portion. This handle may in a simple manner be formed by a rigid encasement of a portion of the flexible pull strand of the inner portion. In order to be sure that this handle will not affect the flexibility of the remaining section of the inner portion, the handle is located between two adjacent linkage points of the running portion while preferably being arranged in spaced relationship to the linkage points.

The assembly of the tire chain may furthermore be simplified by having the closing elements of the assembly member and the pertaining counter elements of the remaining section of the inner portion provided with markings, for instance, in color, which are associated with each other so that an accidental incorrect closing of the inner portion is practically impossible.

In view of the design according to the present invention it is possible to provide the assembly member with a curvature diameter which corresponds approximately to the diameter of the tire shoulders of the pertaining tire size whereby also the assembly will be simplified.

The outer portion of the tire chain according to the present invention may be formed in a simple manner by a pull strand, especially a chain strand, which will assure a high flexibility of the outer portion during the assembly.

In order to permit an easy widening of the outer portion during the assembly, the pull strand forming the outer portion has a stretched length which relative to the arc measure in condition of operation is increased preferably by about one third.

In order to make sure that the running section will during the assembly be aligned relative to the outer portion, the latter is longitudinally non-displaceably linked to the running section.

For purposes of transferring the outer portion from its assembly condition to the condition of operation, it is expedient to provide a tensioning element for tensioning the outer portion in condition of operation. This tensioning element may, in a simple manner, be formed by a spring element which is located between the linkage points of the running portion on the outer portion and tensions the outer portion inwardly. The outer portion, when in condition of operation, will extend through the spring element in a zig-zag manner in the circumferential direction of the tire. The spring element may be formed, for instnace, by a pull spring strand, especially a rubber elastic tensioning cable, which can be braided into the pull strand which in condition of operation extends in a zig-zag manner and forms the outer portion. In order to be able to maintain the spring element in condition of operation, the spring element, preferably at its ends, is provided with connecting elements, especially hooks, for connection to the tire chain.

The dimensions of the tire chain according to the present invention may for an easy accessibility of the spring element during the tensioning be so selected that the spring element, when in condition of operation, is arranged approximately along a circle the diameter of which corresponds approximately to the rim diameter of the pertaining tire size.

Another way of widening the outer portion for facilitating the assembly of the tire chain may consist in making the outer portion so that it can be opened up. In this connection the outer portion is for purposes of detachably connecting the two outer portions provided with a closing member, especially a hook. If this closing member or element of the outer portion, which element serves as opening element for the running portion, is provided between the two separated linkage points of the end chain sections of the running portion, the running portion can be opened completely by opening the inner portion and by opening the outer portion, whereby the assembly of the tire chain is still further simplified. Only after the inner portion has been closed, it is necessary to close the outer portion whereupon it can be additionally tensioned.

For purposes of simplifying the closing of the outer portion, the closing member of the outer portion is adapted to be connected to a plurality of serially arranged counter elements at the other end of the outer portion. Preferably, the counter elements are formed by a chain section which serves as closing chain and freely extends away from the linkage point of the pertaining end chain section of the running portion. If the closing member of the outer portion during the assembly of the tire chain could not be connected to the closing chain directly within the range of the linkage point of the pertaining end chain portion of the running portion, but only remote therefrom, it will be appreciated that, after driving a few miles with the tire chain applied to the tires, a displacement of the closure member of the outer portion into the region of this linkage point will be possible because the tire chain will, in view of the driving, have aligned itself relative to the tire.

The closing chain may be provided in a simple manner for connecting a connecting element of the spring member while it extends preferably in its operative condition in a direction transverse to and over the annular outer portion. In this way it will be assured that the closing chain will be tightened by the spring element and during the rotation of the wheel cannot beat against the body or other parts of the vehicle.

With the tire chain according to the invention means necessary for assembling the chain on the tire form components of the chain itself.

Figure 1:
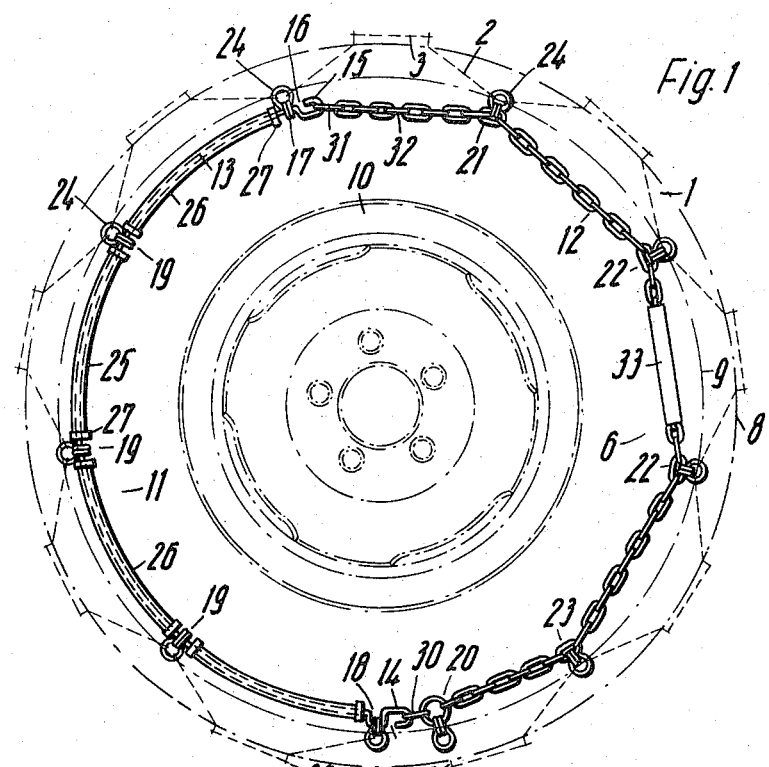
FIG. 1 shows a tire chain according to the invention in assembled condition as it appears when looking upon the inner side of the tire.
Figure 2:
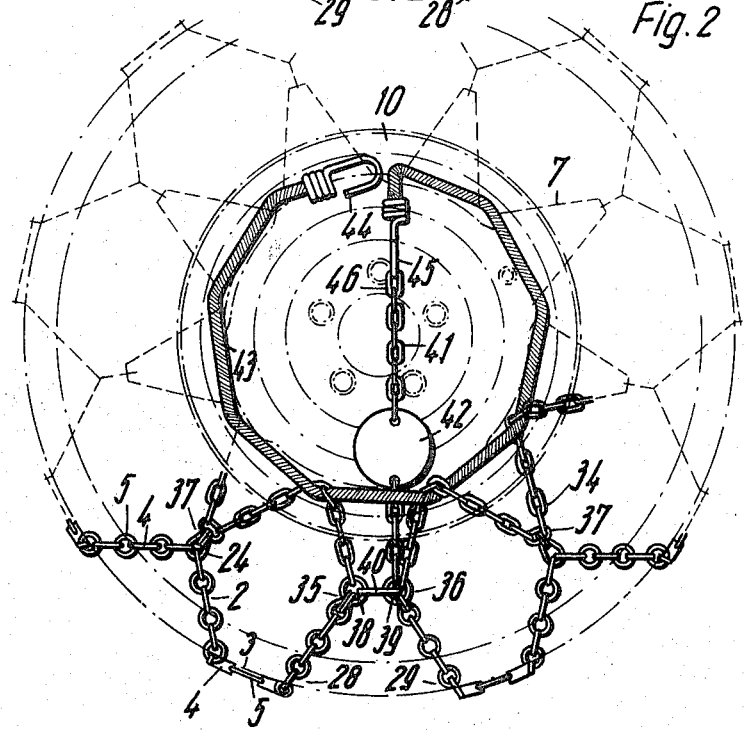
FIG. 2 shows the tire chain according to FIG. 1 when seen from the outside of the tire, i.e. in an illustration of the tire chain of FIG. 1 turned about the vertical axis by 180° relative to FIG. 1.

Referring now to the drawings in detail, FIGS. 1 and 2 illustrate a tire chain according to the present invention with a running portion 1. This running portion 1 comprises chain sections 2 which extend at an incline with regard to the tire circumferential direction, and furthermore comprises chain sections 3 which extend in the tire circumferential direction. Furthermore, the running portion 1 comprises web elements 4 and ring elements 5 connecting the web elements 4 to each other. The chain sections 2 which extend at an incline to the tire circumferential direction or running direction form configurations of diamond shape which extend over the entire width of the tire. The corners of the diamond-shape configurations which point in the tire circumferential direction are interconnected by means of a chain section 3 located in the center of the tire width and forming a track element. The running portion 1 is provided between two wheel sections 6 and 7 of which one, namely the inner portion 6, is provided for engagement with the inner side of the tire, whereas the outer portion 7 is provided for engagement with the outer side of the tire. The tire 8 has been illustrated in FIGS. 1 and 2 by dot-dash lines and at 9 has a tire shoulder. The rim 10 on which the tire 8 is mounted is likewise indicated by dot-dash lines.

The annular inner portion 6 of the tire chain which inner portion in assembled condition is located near the inner tire shoulder 9 of the tire 8 is formed primarily by an assembly member 11 and a chain strand 12 supplementing the assembly member 11 to form the closed inner portion 6. The chain strand 12 thus forms the remaining section of the inner portion 6. The pitch circle-shaped assembly member 11 is formed primarily by a pitch circle-shaped bent bar 13 of spring steel or the like, in which instance the spring steel may be of circular cross section. At both ends the bar 13 is bent to form an open hook 14, 15. The insertion openings 16 of the hooks 14, 15 are located at the convex curvature side of the assembly member 11, in other words radially on the outside of the assembly member. The assembly member 11 has a circular angle of slightly less than 180°. In the illustrated design, the running portion 1 of the tire chain has a pitch angle of 40° which means that the circular angle of the configurations of the running portion which repeat each other or the distance between the linkage points of the running portion 1 to the inner portion 6 and to the outer portion 7 amounts to 40°. On the assembly member of the thus formed nine linkage points 17–23 of the running portion 1, the inner portion 6 has five linkage points 17–19 of which two linkage points 17, 18 are directly adjacent to one of the two closing members 14, 15 whereas the three remaining linkage points 19 are correspondingly distributed between the ends of the assembly member 11. The running portion 1 is by means of closed hooks 24 linked to the assembly member 11 and, more specifically, directly to the bar 13. Between each two adjacent linkage points 17–19 on the assembly member 11 there is provided a spacer element or sleeve 25, 26 in the shape of a casing or mantle for the bar 13 whereby the hooks 24 are prevented from becoming too much displaced relative to the assembly member 11 as a result of which displacement the distance between the linkage points 17–19 could be changed in an undesired manner. The sleeves 25, 26, which may consist, for instance, of rubber elastic material, have their ends provided with a collar 27 of increased diameter. The circular angle of the assembly member 11 amounts for the above outlined reasons to approximately four times the pitch angle of the running portion 1 which means that the circular angle of the assembly member 1 is less by the pitch angle than the circular angle of the remaining section 12 of the inner portion 1.

The chain strand which forms the remaining section 12 of the inner portion 6 is composed of flat oval chain links and is at the linkage points 20–23 connected to the running portion 1. The hooks 24 engaging each linkage point are inserted directly into a link of the chain strand 12. At one end of the chain strand 12 and directly adjacent to this end there is provided a linkage point 20 of the running portion 1. Within this region, the running portion 1 forms an end section 28. This end section 28 is not connected through a tracking member 3 or the like to the oppositely located other end portion 29 of the running portion 1, which end portion 29 is linked to the pertaining end of the assembly member 11. This end of the chain strand 12 which is located directly adjacent to the linkage point 20 has associated therewith a counter element 30 for the detachable connection with one end hook 14 of the assembly member 11. The counter element 30 may, for instance, be formed by a flat oval element which is similar to the remaining flat oval elements of the chain strand 12. Expediently, the hook 14 and the pertaining counter element 30 are provided with markings, for instance, with markings of identical color so that errors during the assembly of the chain will be avoided. The closure or lock of the inner portion 6 formed by the hook 14 and the counter element 30 is thus located between two linkage points 18, 20 of the running portion 1 which connecting or linkage points are directly adjacent to the lock. One of the linkage points is provided on the assembly member 11 whereas the other linkage point 20 is provided on the remaining section 12 of the inner portion. A direct connection of the chain sections of the running portion 1 on both sides of the lock is not provided, so that after opening the lock 14, 30, also the running portion 1 is opened at least up to the outer portion 7 in such a way that its two end sections 28, 29 can be moved away from each other.

The counter element 31 of the chain strand 12 which counter element is associated with the other hook 15 of the assembly member 11 is formed by the end link of a chain piece 32. This end link has a length corresponding to the pitch of the inner portion 6, in other words, is located on the chain strand 12 at a greater distance from the nearest linkage point 21 of the running pgrtion 1. The linkage points 17, 21 of the running portion 1 on assembly member 11 which linkage points are located on both sides of the lock 6 formed by the hook 15 and counter element 31, and the chain sections 2 which extend away from the chain strand 12 are interconnected by a tracking member 3 so that in this range after the lock 15, 31 of the inner portion 6 has been opened, the running portion 1 will not have opened over this entire width as it is the case in the oppositely located range.

Symmetrically opposite to the assembly member 11 and between the two corresponding linkage points 22 of the running portion 1, the chain strand 12 comprises a handle 33 which is formed by a mantle piece of the corresponding portion of the chain strand 12. This mantle piece 33 is located in spaced relationship to the two adjacent linkage points 22 which means is shorter than the pertaining portion of the chain strand 12.

The outer portion 7 of the tire chain is likewise formed by a chain strand 34 which is composed of substantially identical flat oval elements similar to the chain strand 12 of the inner portion 6. The running portion 1 is at a pitch corresponding to the pitch of the inner portion 6 linked to the linkage points 35-37 on the outer chain strand 34 by means of the same hooks 24 as on the inner portion 6. The hooks 24 likewise engage an element of the chain strand 34 in such a way that the linkage points 35-37 are non-displaceable relative to the chain strand 34 in the longitudinal direction of the chain strand 34. The stretched length of the outer chain strand 34 is by approximately one third longer than the circumference of that circle on which all linkage points 35-37 of the running portion 1 are located. It is for this reason that the chain strand 34 in assembled condition extends in a zig-zag manner, which means between the respective two adjacent linkage points along an approximately V-shaped path. Due to this design of the chain strand 34, the latter can be correspondingly widened in conformity with the respective condition of operation as shown in FIG. 4. The chain strand 34 is designed as an open chain strand which comprises two circular end links 38, 39. To one of the two end links, namely the end link 38, there is connected a flat hook 40 which is adapted detachably to be inserted into the other end link 39 which forms the counter link. Both end links 38, 39 simultaneously serve as linkage elements for separate chain portions of the running portion 1. These chain portions are formed by the end portions 28, 29 of the running portion 1. If thus the outer chain strand 34 of the tire chain is opened by opening the hook 40, simultaneously the running portion 1 is opened up to the oppositely located closure or lock 14, 30 which is arranged on the tire inner side. The lock 14, 30 can likewise be opened so that then the running portion 1 can be spread out practically into a stretched position inn which its two ends 28, 29 are completely separated from each other.

That end link 39 of the chain strand 34 to which the hook 40 is linked has connected thereto an additional chain piece 41 which is composed primarily of substantially identical flat oval links as the chain strand 34 and into the chain links of which the hook 40 may likewise be inserted. Between the ends, the chain piece 41 may have a plate 42 of the like for facilitating the handling. If hook 40, when placing the tire chain upon the tire cannot immediately be suspended in the counter link 39 in the way most favorable for the operational condition, due to the fact that the tire chain is not sufficiently aligned relative to the tire, the hook 40 may be suspended in one of the links of the chain piece 41. When driving with the thus placed tire chain, the latter will by itself spread over the tire so that the hook 40 can be taken out of the chain piece 41 and can easily be suspended in the counter link 39.

For tensioning and for maintaining the outer chain strand 34 tensioned in operative condition, there is provided a tensioning element 43 in the form of a rubber elastic tensioning cable. This cable has its ends provided with substantially identical hookshaped connecting elements 44, 45 consisting of a bent wire. The tensioning cable 43 is connected by hook 44 by suspending the hook in a link of the chain strand 34. The hook 44 is preferably located opposite the hook 40 of the outer chain strand 34 and is suspended between two linkage points. Starting from this connecting point, the tensioning cable 43 is subsequently braided in between the linkage points of the chain strand 34 into the latter in conformity with FIG. 2 over the entire circumference whereupon the other end which is equipped with the hook 45 is suspended in the end link 46 of the chain piece 41 which thus extends transverse over the rim 10 and is kept in tightened condition.

Prior to the assembly of the tire chain according to the invention, the tensioning cable 43 is taken off the tire chain, and all locks 14, 30; 15, 31 and 40, 38 are opened. One of the intermediate spacer members of the assembly member 11 and, more specifically, that spacer member 25 which is closer to the hook 15 of the assembly member 11 forms a handle. For purposes of defining this spacer member as handle, a colored marking may be provided thereon. The tire chain is held up with the right hand on the handle 25 and with the left hand on the handle 33. In this way the tire chain will by itself occupy a position expediently aligned for the assembly.

Subsequently, the tire chain is so placed on the ground and spread on the end face side of the tire that is longitudinal direction is located approximately parallel to the running direction of the tire 8 and that the inner portion 6 is closer to the tire 8 than the outer portion 35. The assembly member 11 curves on the right-hand side of the tire 8 in front of the latter. Thereupon the assembly member 11 is placed on the right-hand side of the tire in the vicinity of the driving path, in other words in the vicinity of the tread surface of the tire, behind the latter which means at the inner end face thereof in such a way that the tire will be located in the convexly curved side of the assembly member 11. The assembly member 11 is moved so far behind the tire 8 that its closure member 14 which is further remote from the handle 25 will, according to FIG. 4, be on the left-hand side of the tire 8. Thereupon this closure member 14 may be connected to the pertaining counter member 30 of the remaining section 12 of the inner portion 6. Thereafter, the assembly member 11 which is connected to the remaining section 12 of the inner portion 6 is by turning about a vertical axis intersecting the tire axis pulled partially again to the outer end face of the tire 8 so that its other closure member will be accessible from the outer tire end face. This closure member 15 as well as the pertaining counter member 33 of the remaining section 12 of the inner portion 6 are then lifted over the tire axis and above the tire axis are interconnected in conformity with FIG. 5. The assembly member 11 will when rising be brought into a vertical position in which the first closure member 14 is located below the wheel axis on the inner end face of the tire, and the assembly member 11 has its curved inner side, especially the side of the handle 25, resting on the tire running surface. Expediently, the assembly member 11 will on the right-hand side laterally of the vertical axial plane of the tire engage the running surface of the latter. The thus closed inner portion 6 is then moved completely against the inner end face of the tire 8 similar to the arrangement of FIG. 1.

The above described movements are possible in particular in view of the fact that the lock 38, 40 is still open. Since when closing the inner portion 6 the two end parts 28, 29 of the running portion 1 are located on both sides of the resting or standing surface of the tire on the driving path, a rolling of the tire during the assembly work is not necessary. After the inner portion 6 has been transferred into the position of FIG. 1, the outer chain strand 34 is by means of the hook 40 closed in the described manner. Finally, the outer chain strand 34 is tensioned by means of the tensioning cable 43 while the tire chain aligns itself completely relative to the tire 8.

As will be evident from the above, the design and application of the chain according to the invention have the advantage that the tire chain can practically not be mounted in an incorrect way. This is important particularly with tire chains having a specially designed wear side and a tire engaging side which differs therefrom, in other words, the present invention concerns a tire chain which is non-symmetric and, therefore, should engage the driving path with one side thereof only. The tire chain according to the invention is at the start of the assembly thereof on the tire spread out in such a way in front of the tire that the wear side of the chain is located at the top.

It is, of course, to be understood that the present invention is, by no means, limited to the particular showing in the drawings but also comprises any modifications within the scope of the appended claims.

What is claimed is:

1. In an antiskid chain for vehicle tires: a running portion adapted to engage the tread of the tire, an inner ring portion connected to one side of said running portion and adapted to be disposed on the axially inner side of the tire, an outer ring portion connected to the other side of said running portion and adapted to be disposed on the axially outer side of the tire, an arcuate assembly member forming a part of said inner ring portion, pairs of cooperating elements of detachable connector means on the ends of said assembly member and on the ends of the other part of said inner ring portion, and said outer ring portion including means for adjusting the diameter thereof, said running portion including flexible elements extending angularly to the plane of the tire and connected to circumferentially spaced points on said inner and outer ring portions, said points on the axially outer side of the tire falling substantially on a circle, said outer ring portion comprising a flexible ring element on the order of a third longer than the circumference of said circle and connected to the said points on the outer side of the tire.

2. An antiskid chain according to claim 1 in which the said elements of each of said pair of detachable connector means are provided with markings indicating the elements to be connected to each other.

3. An antiskid chain according to claim 1 which includes a longitudinally resilient tensioning element engaging said ring element between said points and drawing the said ring element inwardly between said points and holding said ring element taut.

4. An antiskid chain according to claim 3 in which said tensioning element has hooks at the ends, said hooks being adapted to be hooked into said chain to hold said tensioning element and said ring element taut.

5. An antiskid chain according to claim 1 in which each of the said opposed ends of said outer ring portion comprises one of said points, said connector detachably connecting the said points at the ends of said outer ring portion.

6. In an antiskid chain for vehicle tires: a running portion adapted to engage the tread of the tire, an inner ring portion connected to one side of said running portion and adapted to be disposed on the axially inner side of the tire, an outer ring portion connected to the other side of said running portion and adapted to be disposed on the axially outer side of the tire, an arcuate assembly member forming a part of said inner ring portion, pairs of cooperating elements of detachable connector means on the ends of said assembly member and on the ends of the other part of said inner ring portion, and said outer ring portion including means for adjusting the diameter thereof, said running portion including flexible elements extending angularly to the plane of the tire and connected to circumferentially spaced points along said ring portions to connect the ring portions to said running portion, one adjacent pair of said elements being connected to one end of said assembly member, a second adjacent pair of said elements substantially diametrically opposite said one pair being connected one to the other end of said assembly member and the other to the end of the other part of said inner ring portion immediately adjacent said other end of said assembly member, said outer ring portion having opposed ends in about the axial plane of said other end of said assembly member and a connector adapted for detachably connecting said opposed ends of said outer ring portion, said running portion also having opposed ends in the region of said axial plane, said elements including adjacent elements connected to the said opposed ends of said running portion and extending therefrom to the respective opposed ends of said outer ring portion, each of the said opposed ends of said outer ring portion comprising one of said points, said connector detachably connecting the said points at the ends of said outer ring portion, one end of said ring element being at one of said points while the other end of said ring element has a further portion extending beyond another of said points and which is adjacent said one point in mounted position of said chain, said connector being adapted to connect said one end of said ring element to the said other end thereof or to selected points along said further portion, said ring element between each of the said points therealong being longer than the circumferential distance between said points when said chain is mounted on a tire, and a longitudinally resilient element entrained about said ring element between said points and having hooks on the ends, one of said hooks being engageable with said chain and the other being engageable with said further portion of said ring element.

7. In an antiskid chain for vehicle tires: a running portion adapted to engage the tread of the tire, an inner ring portion connected to one side of said running portion and adapted to be disposed on the axially inner side of the tire, an outer ring portion connected to the other side of said running portion and adapted to be disposed on the axially outer side of the tire, said inner ring portion being formed of a relatively stiff arcuate assembly member and a flexible member, pairs of cooperating elements of detachable connector means on the ends of said assembly member and on the ends of the flexible member, and said outer ring portion comprising a flexible ring element and including means for adjusting the diameter thereof, said running portion including flexible elements extending angularly to the plane of the tire and to each other from links connected to circumferentially spaced points on said inner and outer ring portions and transverse elements substantially parallel to the plane of the tire interconnecting said flexible elements, said inner and outer ring portions connected angularly over the range of a plurality of said points and including means for retaining said flexible elements at said points, and said flexible ring element being on the order of a third longer than the circle defined by said spaced points and connecting said points, said means for adjusting the diameter consisting of a circumferential, resilient element connected to said flexible element at a plurality of points inwardly of said flexible ring element to maintain said tire chain in close engagement with said tire.

8. An antiskid chain according to claim 7, in which sleeve-like spacer members on said arcuate assembly member extend between adjacent ones of said spaced points, at least one of said spacer members serving as a handle for manipulation of said assembly member.

9. An antiskid chain in combination according to claim 7 in which said assembly arcuate member is an arcuate resilient member which extends over an angle of about 180° about the axis of rotation of the tire.

10. An antiskid chain in combination according to claim 9 in which said central running portion is connected to said inner ring portion at circumferentially spaced points, said arcuate assembly member extending over an angle including a predetermined number of said points and the other part of said inner ring portion extending over an angle which includes a number of points which exceed said predetermined number by at least one, said other part of said inner ring portion being flexible, said assembly member being an arcuate resilient member having a radius of curvature substantially the same as the radius of the tire at the junction of the tread of the tire and the side wall of the tire.

11. An antiskid chain in combination according to claim 10 in which said running portion includes flexible elements extending angularly to the plane of the tire and connected to circumferentially spaced points along said ring portions to connect the ring portions to said running portion, one adjacent pair of said elements being connected to one end of said assembly member, a second adjacent pair of said elements substantially diametrically opposite said one pair being connected one to the other end of said assembly member and the other to the end of the other part of said inner ring portion immediately adjacent said other end of said assembly member, said outer ring portion having opposed ends in about the axial plane of said other end of said assembly member and a connector adapted for detachably connected said opposed ends of said outer ring portion, said running portion also having opposed ends in the region of said axial plane, said elements including adjacent elements connected to the said opposed ends of said running portion and extending therefrom to the respective opposed ends of said outer ring portion.

12. An antiskid chain in combination according to claim 11 in which said central running portion includes flexible elements extending angularly to the plane of the tire and connected to circumferentially spaced points on said inner and outer ring portions, the said detachable connector means at one end of said assembly member being disposed between an adjacent pair of said spaced points, said running portion including elements substantially parallel to the plane of said tire and interconnecting said flexible elements.

13. An antiskid chain according to claim 7 in which each end of said assembly member is connected to one of of said flexible elements, the other part of said inner ring portion being flexible and including a hand grip thereon in substantially the middle thereof.

14. An antiskid chain according to claim 7 in which a plurality of said points are distributed along the length of said other part of said inner ring portion, and said hand grip is in the form of a substantially rigid tubular member mounted on said inner ring portion between an adjacent pair of said points.

* * * * *